US012632947B2

(12) United States Patent
Gahm et al.

(10) Patent No.: US 12,632,947 B2
(45) Date of Patent: May 19, 2026

(54) METHOD FOR DETECTING SURFACE DEFECT AND APPARATUS THEREOF

(71) Applicant: Pusan National University Industry—University Cooperation Foundation, Busan (KR)

(72) Inventors: Jin Kyu Gahm, Busan (KR); Il Hae Yu, Busan (KR); Won June Choi, Busan (KR)

(73) Assignee: Pusan National University Industry—University Cooperation Foundation, Busan (KR)

( * ) Notice: Subject to any disclaimer, the term of this patent is extended or adjusted under 35 U.S.C. 154(b) by 277 days.

(21) Appl. No.: 18/397,542

(22) Filed: Dec. 27, 2023

(65) Prior Publication Data
US 2025/0209595 A1    Jun. 26, 2025

(30) Foreign Application Priority Data

Dec. 22, 2023    (KR) ........................ 10-2023-0189365

(51) Int. Cl.
G06T 7/00        (2017.01)
(52) U.S. Cl.
CPC .. G06T 7/0004 (2013.01); G06T 2207/20081 (2013.01); G06T 2207/20084 (2013.01); G06T 2207/30136 (2013.01)
(58) Field of Classification Search
CPC ........... G06T 7/004; G06T 2207/20081; G06T 2207/20084; G06T 2207/30136;
(Continued)

(56) References Cited

U.S. PATENT DOCUMENTS 7,646,906 B2 *    1/2010    Saidin ..................... G03F 7/705
                                                        356/239.8
7,835,565 B2 *    11/2010    Cai .................. G01N 21/95607
                                                        382/274
(Continued)

FOREIGN PATENT DOCUMENTS

CN        111242899 A        6/2020
CN        111402236 A    *    7/2020    ....... G06F 18/24137
(Continued)

OTHER PUBLICATIONS

Li et al. "Application of Machine Learning Algorithms in Cold-Rolled Strip Steel Surface Defect Grading Systems." 28th International Conference on Automation and Computing (ICAC) (pp. 1-6) IEEE (Year: 2023).*

(Continued)

*Primary Examiner* — Scott A Rogers
(74) *Attorney, Agent, or Firm* — Bridgeway IP Law Group, PLLC; Sang Ho Lee; Hyun Woo Shin

(57)        ABSTRACT

Provided is a method of detecting a surface defect. The method includes acquiring a target image, detecting at least one defect area from the target image, generating a first defect matrix having a size corresponding to the target image and an element that is a first defect score calculated based on the number of defect areas, calculating a plurality of second defect scores by summing first defect scores in a range corresponding to a predetermined reference window in the first defect matrix, and extracting an image corresponding to the reference window from the target image based on the second defect score and generating a defect image.

12 Claims, 5 Drawing Sheets

(58) Field of Classification Search

CPC ............... G01N 21/8851; G01N 33/20; G01N 2021/8854; G01N 2021/8883; G01N 2021/8887; G01N 2021/8918

See application file for complete search history.

(56) References Cited

U.S. PATENT DOCUMENTS

| | | | |
|---|---|---|---|
| 8,611,639 B2 * | 12/2013 | Kulkarni | G01N 21/9501 |
| | | | 382/150 |
| 12,320,756 B2 * | 6/2025 | Ono | G01N 21/8851 |
| 2019/0096057 A1 | 3/2019 | Allen et al. | |
| 2020/0160083 A1 | 5/2020 | Zhu et al. | |
| 2020/0364906 A1 | 11/2020 | Shimodaira | |
| 2023/0021099 A1 * | 1/2023 | Becher | G06T 7/0004 |
| 2023/0206420 A1 * | 6/2023 | Wang, Sr. | G06T 7/001 |
| 2025/0124307 A1 * | 4/2025 | Yahalom | G06T 7/0004 |

FOREIGN PATENT DOCUMENTS

| | | | | |
|---|---|---|---|---|
| CN | 114170208 A | | 3/2022 | |
| CN | 116012370 A | * | 4/2023 | |
| CN | 112184667 B | * | 2/2025 | .............. G06T 5/70 |
| EP | 4579225 A1 | * | 7/2025 | .......... G06T 7/0004 |
| JP | H08-189904 A | | 7/1996 | |

OTHER PUBLICATIONS

Qiao et al. "A Review of Metal Surface Defect Detection Technologies in Industrial Applications." IEEE Access (Year: 2025).*

The extended European search report and opinion dated Jun. 25, 2024 in EP Application No. 23220331 (Year: 2024).*

JPO Reasons for Refusal in application No. JP 2023-218529 dated Apr. 15, 2025 (Year: 2025).*

JPO Written Opinion in application No. JP 2023-218529 dated Jul. 14, 2025 (Year: 2025).*

* cited by examiner

100

(a) (b) (c) (d)

(e) (f) (g)

METHOD FOR DETECTING SURFACE DEFECT AND APPARATUS THEREOF

CROSS-REFERENCE TO RELATED APPLICATION(S)

The present application claims priority and benefit of Korean patent Application No. 10-2023-0189365 filed on Dec. 22, 2023, the disclosure of which is incorporated herein by reference in its entirety.

BACKGROUND

Field of the Invention

The present application relates to a method and apparatus for detecting a surface defect.

Discussion of Related Art

With the recent development of artificial intelligence, the number of intelligent factories incorporating artificial intelligence into a manufacturing process is increasing. Image classification using deep learning as one artificial intelligence technology is used to classify defects that occur in the manufacturing process, with which conventional defect classification tasks performed by humans are replaced and which contributes to process efficiency and quality advancement.

Meanwhile, various shapes and types of defects may occur in cold-rolled steel sheets as they are subjected to rolling and recoiling processes. Since the manufacturing process varies depending on the use and quality of products, the distribution of defect characteristics becomes more diverse. Since specific defects of products may cause fatal defects of products during product manufacturing, a cold-rolled steel surface defect detector (SDD) is introduced to detect defects for quality inspection, and recently, a method of detecting defects using the SDD and classifying the defects using deep learning-based models has been researched.

However, since the defect images detected by the SDD have various sizes and aspect ratios, it is necessary to adjust the defect images to a standardized model. In general, in order to process data into an image of a standardized size, a crop preprocessing method of cutting out some areas of the image, a resize preprocessing method of adjusting the size of the image into the standardized model, and a padding preprocessing method of setting a padding value set to an edge of the image are used.

In the case of such general preprocessing methods, image features may be lost, which causes a problem that the reliability of the deep learning-based classification models is degraded. In particular, since defect images generated from various manufacturing processes according to different uses and required quality have a more diverse distribution of defect characteristics, such as shapes and types of the defects, there is a need for the development for a technology capable of improving the defect classification performance for the defect images.

SUMMARY OF THE INVENTION

Technical Problem

The present application is directed to providing a method and apparatus for detecting a surface defect.

Technical Solution

According to an embodiment of the present application, there is provided a method of detecting a surface defect. The method includes acquiring a target image, detecting at least one defect area from the target image, generating a first defect matrix having a size corresponding to the target image and an element that is a first defect score calculated based on the number of defect areas, calculating a plurality of second defect scores by summing first defect scores in a range corresponding to a predetermined reference window in the first defect matrix, and extracting an image corresponding to the reference window from the target image based on the second defect score and generating a defect image.

In addition, the method may further include inputting the defect image as input data into a network function and generating surface defect information, wherein the network function may be trained to output the surface defect information using an image with a size corresponding to the reference window as input data.

In addition, the element of the first defect matrix may be determined according to the number of defect areas detected from the target image at a position corresponding to the element.

In addition, the calculating of the second defect score may be performed by calculating the second defect score, which is the sum of the first defect scores of the first defect matrix corresponding to the predetermined reference window, while moving the reference window with respect to the first defect matrix, and the generating of the defect image may be performed by extracting an image corresponding to a position of the reference window with the largest second defect score from the target image.

In addition, the method may further include generating a second defect matrix by applying a standard deviation for each local area of the target image to the first defect matrix, wherein the calculating of the second defect score may be performed on the second defect matrix with which the first defect matrix is replaced.

In addition, the generating of the second defect matrix may include generating a standard deviation matrix by calculating the standard deviation for each local area from the target image and summing weights of the first defect matrix and the standard deviation matrix.

In addition, the method may further include generating a third defect matrix by removing an element corresponding to a non-defect area from the second defect matrix, wherein the calculating of the second defect score may be performed on the third defect matrix with which the second defect matrix is replaced.

In addition, the generating of the third defect matrix may include generating a non-defect area having a size corresponding to the target image and representing at least one of background and padding from the target image, and performing an AND operation on the non-defect matrix and the first defect matrix.

In addition, the detecting of the defect area may include generating boundary value information from the target image, generating boundary direction information from the target image, selecting information on a boundary value greater than or equal to a predetermined critical value based on the boundary value information and the boundary direction information, and detecting a defect area based on the selected boundary value information and the corresponding boundary direction information.

In addition, operations from the detecting of the defect area to the generating of the defect image may be performed when at least one of horizontal and vertical sizes of the target image is larger than that of the reference window.

In addition, the method may further include adding padding to a periphery of the target image so that the target image corresponds to the reference window when at least one of horizontal and vertical sizes of the target image is smaller than that of the reference window.

According to an embodiment of the present application, there is provided a computer program. The program may be stored in a recording medium to execute the method of detecting the surface defect according to the embodiment of the present application.

According to an embodiment of the present application, there is provided an apparatus for detecting a surface defect. The apparatus includes a memory in which a program for detecting a surface defect is stored, and a processor configured to acquire a target image, detect at least one defect area from the target image, generate a first defect matrix having a size corresponding to the target image and an element that is a first defect score calculated based on the number of defect areas, calculate a plurality of second defect scores by summing first defect scores in a range corresponding to a predetermined reference window in the first defect matrix, and extract an image corresponding to the reference window from the target image based on the second defect score to generate a defect image by.

In addition, the processor may generate a second defect matrix by applying a standard deviation for each local area of the target image to the first defect matrix, and calculate the second defect score using the second defect matrix with which the first defect matrix is replaced.

In addition, the processor may generate a third defect matrix by removing an element corresponding to a non-defect area from the second defect matrix, and calculate the second defect score using the third defect matrix with which the second defect matrix is replaced.

Advantageous Effects

According to embodiments of the present application, it is possible to classify defects of target images having various sizes and aspect ratios.

In addition, it is possible to increase classification accuracy by minimizing feature losses of various types of surface defect images.

In addition, it is possible to prevent increase or decrease in feature information by preventing the resizing of the target images.

The effects obtainable from the embodiments of the application are not limited to the above-described effects, and other effects that are not mentioned will be able to be clearly understood by those skilled in the art to which the present application pertains from the following description.

BRIEF DESCRIPTION OF THE DRAWINGS

A brief description of each drawing will be made for better understanding for the accompanying drawings cited in the present application.

4

Figure 4:
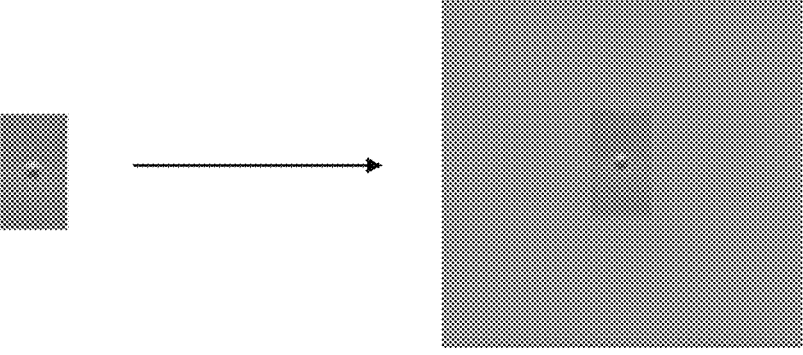
Figure 5:
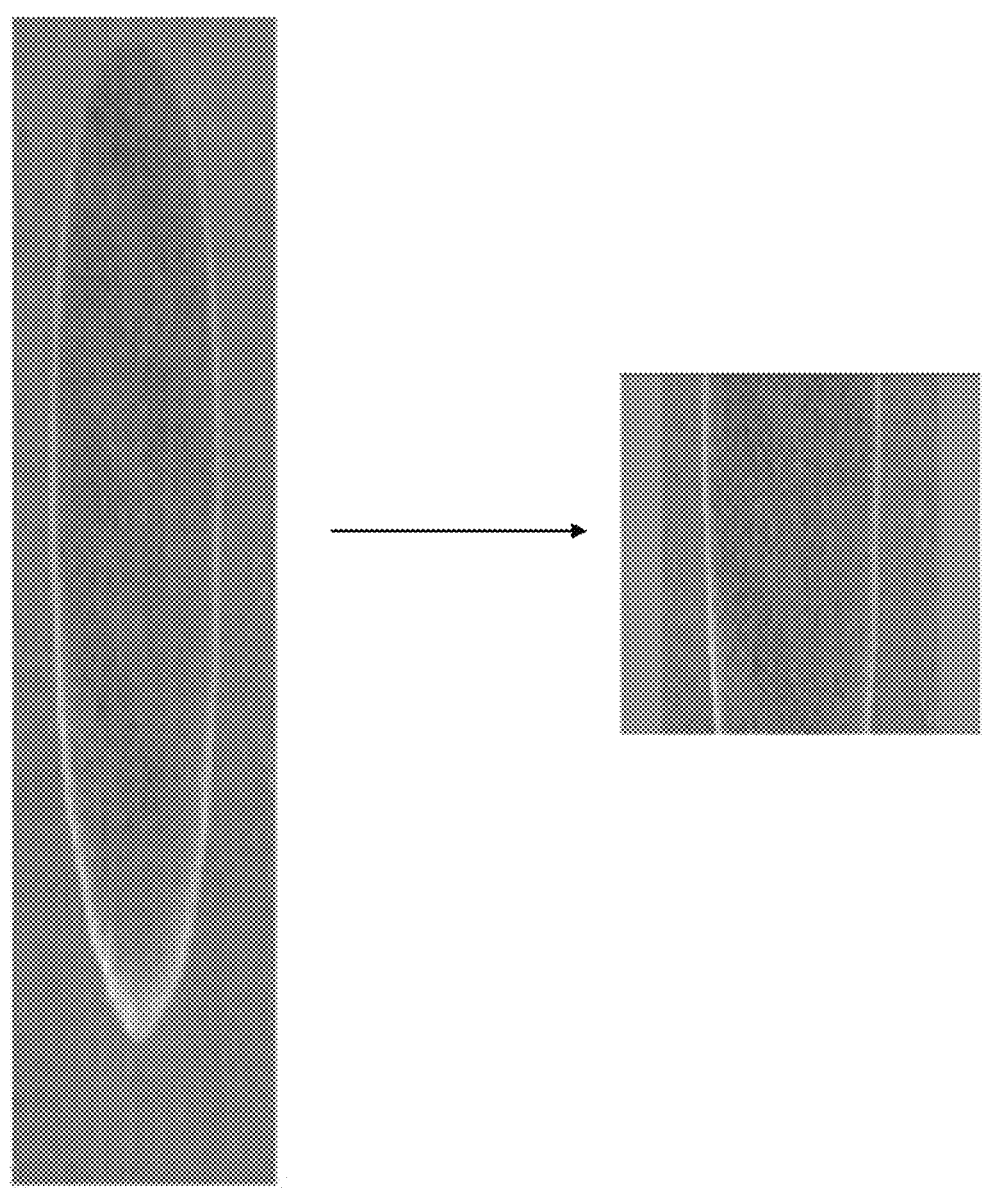

FIGS. 4 and 5 are exemplary views of image preprocessing for detecting a defect according to the embodiment of the present application.

Figure 6:
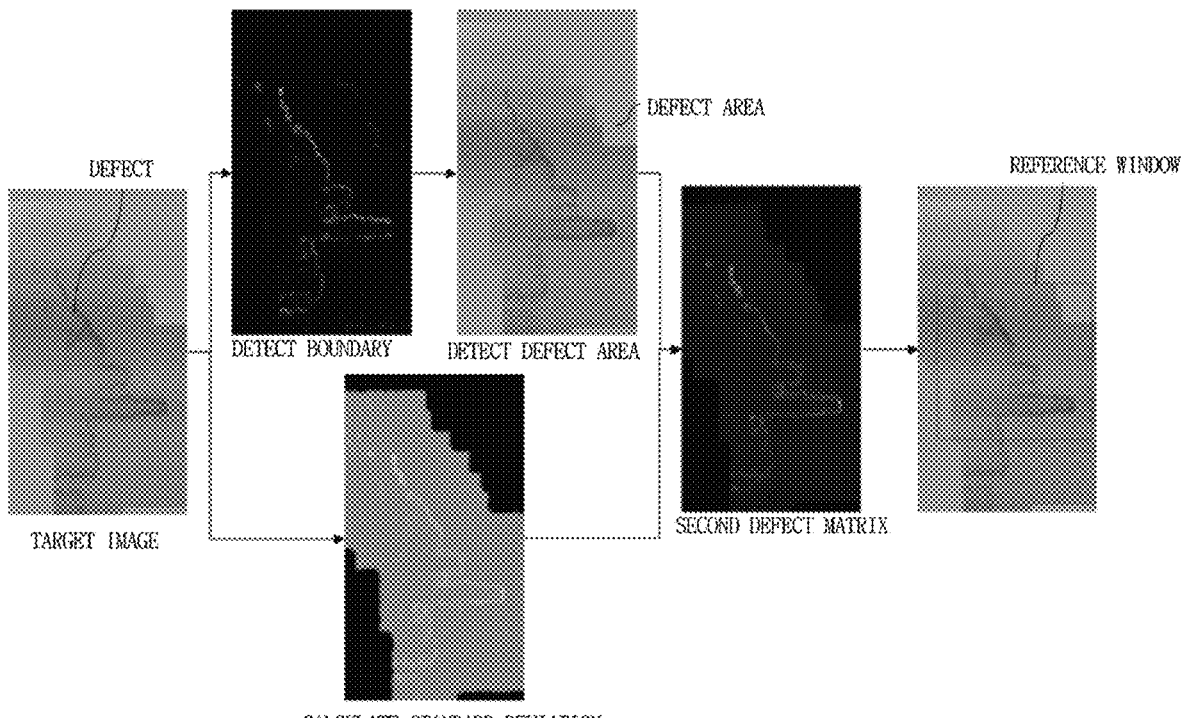

FIG. 6 is a view for describing a process of detecting a defect according to the embodiment of the present application.

DETAILED DESCRIPTION OF EXEMPLARY EMBODIMENTS

Since the technical spirit of the present application may have various changes and various embodiments, specific embodiments are illustrated in the accompanying drawings and will be described in detail. However, it should be understood that it is not intended to limit the technical spirit of the present application to specific embodiments and includes all modifications, equivalents, and substitutes included in the scope of the technical spirit of the present application.

In describing the technical spirit of the present application, when it is determined that the detailed description of a related known technology may unnecessarily obscure the gist of the present application, detailed description thereof will be omitted.

The terms used in the present specification are only used to describe embodiments and are not intended to restrict and/or limit the present application. The singular expression includes the plural expression unless the context clearly dictates otherwise. In addition, numbers (e.g., first and second) used in the present specification are merely identifiers for distinguishing one component from another component.

Throughout the present specification, when a first component is described as being "connected to" a second component, this includes not only a case in which the first component is "directly connected" to the second component, but also a case in which the first component is "indirectly connected" to the second component with a third component interposed therebetween. In addition, when a certain portion is described as "including," a certain component, this means further including other components rather than precluding other components unless especially stated otherwise.

In addition, in the present application, the term "or" is intended to mean an inclusive "or" rather than an exclusive "or." In other words, unless otherwise specified or clear from the context, "X uses A or B" is intended to mean one of the natural inclusive substitutions. In other words, when X uses A, X uses B, or X uses both A and B, "X uses A or B" can be applied to any of the above cases. In addition, it should be understood that the term "and/or" as used in the present specification should be understood to indicate and include all possible combinations of one or more of the listed related items.

In addition, terms such as "unit," "instrument," "part," and "module" described in the present application refer to a unit that processes at least one function or operation, which can be implemented by hardware such as a processor, a micro processor, a micro controller, a central processing unit (CPU), a graphics processing unit (GPU), an accelerate processor unit (APU), a digital signal processor (DSP), an application specific integrated circuit (ASIC), or a field programmable gate array (FPGA), software, or a combination of hardware and software.

In addition, it should be noted that components in the present application are merely distinguished according to a main function of which each component is in charge. In other words, two or more components to be described below may be combined into one component, or one component may be divided into two or more components for each more detailed function. In addition, it is understood that each component to be described below may additionally perform some or all of functions of which other components are in charge in addition to the main function of which each component is in charge, and some of the main functions of which each component is in charge may be performed by being dedicated by other components.

A method according to an embodiment of the present application may be performed on a personal computer, work station, or server computer device provided with computational ability or performed on a separate device for this purpose.

In addition, the method may be performed on one or more computational devices. For example, at least one or more operations of the method according to the embodiment of the present application may be performed in a client device, and other operations may be performed in a server device. In this case, the client device and the server device may be connected via a network and may transmit and receive a result of computation. Alternatively, the method may be performed by a distributed computing technology.

Throughout the present specification, a network function may be used interchangeably with a computational model, a neural network, or a neural network. The neural network may be generally composed of a set of interconnected computational units, which can be referred to as nodes. These nodes may be referred to as neurons. The neural network may be configured to include at least one node. Nodes (or neurons) constituting the neural network may be interconnected by one or more links.

In the neural network, one or more nodes connected through the links may form the relative relationship between an input node and an output node. The concept of the input node and the output node is relative, and any node in an output node relationship with respect to one node may be in an input node relationship with respect to another node, and vice versa. As described above, the relationship between the input node and the output node may be generated with respect to the links. One or more output nodes may be connected to one input node through the links, and vice versa.

In the relationship between the input node and the output node connected through one link, a value of data of the output node may be determined based on data input to the input node. Here, the link interconnecting the input node and the output node may have a weight. The weight may be variable and may be changed by the user or algorithm in order for a neural network to perform a desired function. For example, when one or more input nodes are interconnected to one output node by respective links, the output node may determine an output node value based on values input to input nodes connected to the output node and a weight set to a link corresponding to each input node.

A subset of the nodes constituting the neural network may form a layer. Some of the nodes constituting the neural network may form one layer based on distances from an initial input node. For example, a set of nodes with a distance n from the initial input node may constitute n layers. The distance from the initial input node can be defined by the minimum number of links that should be passed to reach the corresponding node from the initial input node. However, the definition of a layer is arbitrary for description purposes, and an order of a layer in a neural network can be defined in a different manner from the above description. For example, layers of nodes can be defined by a distance from a final output node.

The neural network may include a deep neural network (DNN) that includes a plurality of hidden layers in addition to an input layer and an output layer. The deep neural network may be used to identify latent structures of data. The deep neural network may include a convolutional neural network (CNN), a recurrent neural network (RNN), an auto encoder, a generative adversarial network (GAN), a restricted Boltzmann machines (RBM), a deep trust network (DBN), a Q network, a U network, a Siamese network, a generative adversarial network (GAN), and the like. The description of the above-described deep neural network is only an example, and the present application is not limited thereto.

The neural network may be trained by at least one way of supervised learning, unsupervised learning, semi-supervised learning, or reinforcement learning. The training of the neural network may be a process of applying knowledge for the neural network to perform a specific operation to the neural network.

Hereinafter, embodiments of the present application will be sequentially described in detail.

Figure 1:
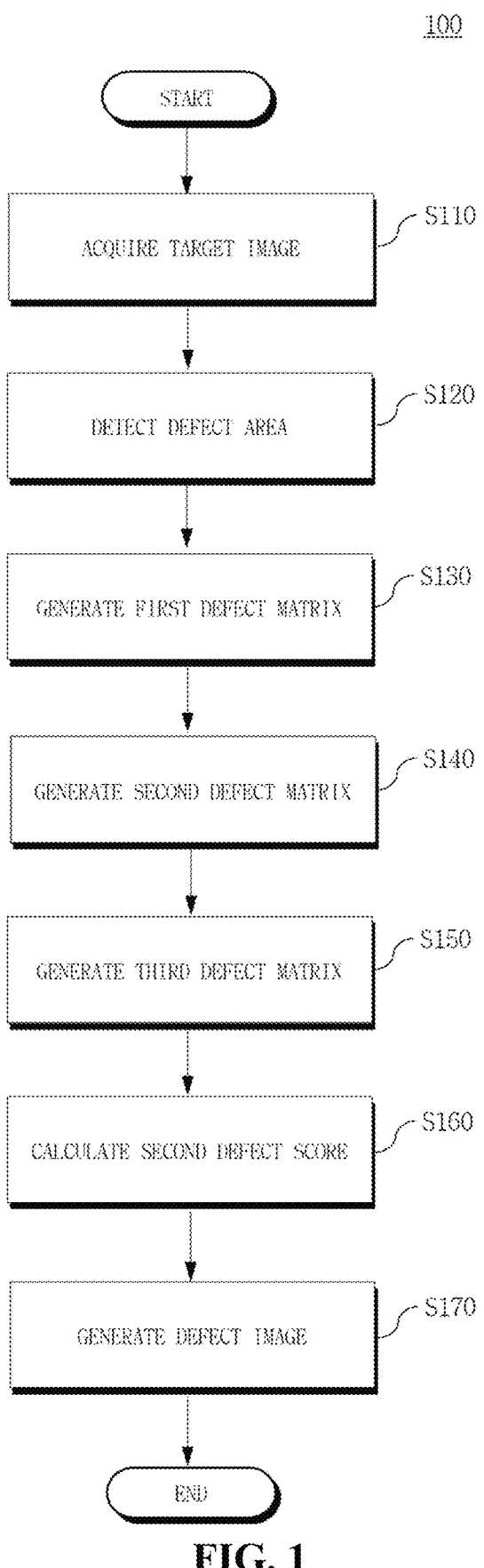
FIG. 1 is a flowchart of a method of detecting a defect according to an embodiment of the present application.

FIG. 1 is a flowchart of a method of detecting a defect according to an embodiment of the present application.

In operation S110, a target image may be acquired. Here, the target image may be a surface image of an object from which defects will be detected.

For example, the target image may be an image about a surface of a cold-rolled steel sheet. In the case of the cold-rolled steel sheet, a pickling process, which is a surface treatment process for removing fine metal contaminants or cleaning a surface by immersing the cold-rolled steel sheet in a strong acid solution, is applied. Therefore, in the case of some alloys or high carbon steels, a hydrogen embrittlement problem may occur, and hydrogen generated from acids may react on a surface to cause defects in a metal. In addition, since the pickling process is a first process of the manufacturing process of the cold-rolled steel sheet and defects occurring during a conveying or manufacturing process of a coil may be detected complexly, the types of defects found in the pickling process are diverse as compared to the types of defects found in other processes. Since sizes of defects vary by up to 5,000 times and a size of a coil used in a cold-rolling process is always constant, absolute sizes of the defects that occur are very important in classifying the defects.

According to the embodiment, the target image may be received from an external database server or acquired through photographing from a photographing device (e.g., a surface defect detector (SDD)) connected to an apparatus for detecting a defect via wired or wireless communication. However, the present application is not limited thereto.

In operation S120, at least one defect area may be detected from the target image. Here, the defect area may be an area including defects formed on a surface and/or an area expected to include the defects formed on the surface. According to the embodiment, the defect area may include only an area corresponding to a defect or further include an area adjacent to the defect. For example, one defect may belong to a plurality of defect areas.

In the embodiment, operation S120 may include generating boundary value information from the target image, generating boundary direction information from the target image, selecting information on a boundary value greater than or equal to a predetermined critical value based on the boundary value information and the boundary direction information, and detecting a defect area based on the selected boundary value information and the corresponding boundary direction information.

In the embodiment, operation S120 may be performed by inputting the target image into a network function. Here, the network function may be trained to output the defect area from the target image.

In the embodiment, the defect area may have a quadrangular shape, and at least one defect may be positioned or expected to be positioned inside the quadrangular boundary. However, the present application is not limited thereto.

In operation S130, a first defect score may be calculated from the target image to generate a first defect matrix. Specifically, the first defect matrix may be generated by calculating the first defect score based on the number of defect areas detected in operation S120 and using the first defect score as an element of the matrix. In particular, the element of the first defect matrix may be determined according to the number of defect areas detected from the target image at a position corresponding to the element.

For example, when a defect is present at a predetermined pixel position in the target image and a plurality of defect areas with respect to the defect are detected, the first defect score may be calculated based on the number of plurality of defect areas, and the first defect score may be assigned to the corresponding pixel position and the corresponding position in the matrix.

In the embodiment, the first defect score may be calculated by summing the number of defect areas. However, the present application is not limited thereto, and the first defect score may be calculated in various ways based on the square of the number of defect areas, deviation, and the like.

In the embodiment, the first defect matrix may have a size corresponding to the target image. Here, when the first defect matrix has the size corresponding to the target image, it may mean that the number of rows and columns of the first defect matrix corresponds to the number of horizontal pixels and the number of vertical pixels of the target image so that the first defect matrix includes sufficient pieces of information about the target image. In particular, when the numbers correspond to each other, it may mean that the numbers are the same or N or 1/N times (here, N is a positive integer).

For example, the number of rows and the number of columns in the first defect matrix may be the same as the number of vertical pixels and the number of horizontal pixels of the target image. For example, when the target image is downsampled and/or upsampled, the first defect matrix may have a size corresponding to the downsampled and/or upsampled target image. However, the present application is not limited thereto.

In operation S140, a second defect matrix may be generated. The second defect matrix may be obtained by applying a standard deviation for each local area of the target image to the first defect matrix. When the defect is relatively large, the influence of the defect on the standard deviation increases, and thus it is possible to increase the accuracy of defect detection in consideration of the standard deviation.

Specifically, operation S140 may include generating a standard deviation matrix by calculating the standard deviation for each local area in the target image, and combining the first defect matrix with the standard deviation matrix.

Here, the standard deviation matrix may be generated by calculating a standard deviation for an image in a deviation window while moving the deviation window having a predetermined size on the target image and using the calculated standard deviation as an element. In this case, a size of the deviation window may correspond to a reference window. However, the present application is not limited thereto, and deviation windows with various sizes may be applied. Likewise, a stride of the deviation window may mean M or 1/M times a size of the reference window (here, M is a positive integer). However, the present application is not limited thereto.

In addition, the standard deviation matrix may have the size that is the same as that of the first defect matrix. When the size of the standard deviation matrix is smaller than that of the first defect matrix, a predetermined element may be added to the standard deviation matrix (i.e., rows and/or columns may be increased) so that the size of the standard deviation matrix is the same as that of the first defect matrix. In this case, a value of the element may be the same or similar to a value of an adjacent element. However, the present application is not limited thereto.

In the embodiment, the sum of the first defect matrix may be a weighted sum. Specifically, the first defect matrix may be generated by multiplying the first defect matrix by a first weight, multiplying the standard deviation matrix by a second weight, and then summing a result of the multiplication. By adjusting the first weight and the second weight, a proportion of the number and standard deviation of defect areas on defect detection may be adjusted.

In operation S150, a third defect matrix may be generated. Specifically, the third defect matrix may be generated by removing elements corresponding to non-defect areas from the second defect matrix.

In the embodiment, operation S150 may include generating a non-defect matrix representing at least one of background and padding from the target image, and performing an AND operation on the non-defect matrix and the second defect matrix.

Here, the non-defect matrix may have a size corresponding to the target image and have the size that is the same as that of the second defect matrix. In addition, the background is an area excluding defects from the target image and may include, for example, a surface image without defects. The padding may refer to a margin added to an outside of the target image to adjust the size of the target image.

For example, in the non-defect matrix, elements corresponding to the background and padding may be set to a value of "0," and the other components may be set to a value of "1." Therefore, when the AND operation is performed on the non-defect matrix and the second defect matrix, elements of positions corresponding to the background and padding in the third defect matrix become 0, and the other elements may be the same as the elements of the second defect matrix.

In the above example, although the element of the non-defect matrix are set to "1" or "0," the present application is not limited thereto, and various values that may distinguish the elements corresponding to the background and padding from the other elements can be applied.

In the embodiment, a filter may be applied to the non-defect matrix to remove noise in the non-defect matrix. For example, noise may be removed by applying a Gaussian filter to a non-defect matrix of which an element is set to "1" or "0." Then, all elements other than "1" may be set to "0." However, the present application is not limited thereto.

In operation S160, a second defect score may be calculated. Specifically, the second defect score may be calculated by summing the first defect scores in a range corresponding to the reference window in the third defect matrix.

Here, the reference window is a virtual area with a predetermined size, and the size of the reference window may correspond to a size of a defect image generated in operation S170. For example, the reference window may be expressed as a matrix of which elements are all "1." However, the present application is not limited thereto.

Specifically, operation S160 may be performed by summing the first defect scores of the third defect matrix corresponding to the reference window while moving the reference window with respect to the third defect matrix. In operation S160, a plurality of second defect scores may be calculated, and a position of the reference window with respect to the third defect matrix may be assigned to each second defect score.

For example, the second defect score may be calculated by moving the reference window with respect to the third defect matrix, perform the AND operation on the corresponding elements of a matrix of the reference window and the third defect matrix, and then summing a result of the calculation.

In operation S170, a defect image may be generated. The defect image may be an image selected to effectively represent defect characteristics from the target image.

Specifically, in operation S170, the defect image may be generated by extracting an image corresponding to the reference window from the target image based on the second defect score. For example, operation S170 may be performed by extracting an image corresponding to a position of the reference window with the largest second defect score from the target image. In other words, the second defect score with the highest score may be selected, and the defect image may be generated from the target image based on the position of the reference window assigned to the corresponding second defect score.

In the embodiment, the method 100 may further include inputting a defect image as input data into a network function and generating surface defect information. Here, the network function may be trained to output surface defect information using an image with a size corresponding to the reference window as input data. In addition, the surface defect information may include at least one of information about whether defects are present and defect classification information. The classification information may include, for example, carbon, oil mark, roll mark, rust, scab, scratch, slip mark, and the like. However, the present application is not limited thereto.

In the embodiment, operations S120 to S170 may be performed when at least one of the horizontal and vertical sizes of the target image is larger than that of the reference window. In other words, when at least a portion of the size of the target image is larger than that of the reference window, operations S120 to S170 may be performed to generate a defect image by extracting only a portion that best represents the defect characteristics from the target image.

In the embodiment, the method 100 may further include adding padding to the periphery of the target image so that the target image corresponds to the reference window when at least one of the horizontal and vertical sizes of the target image is smaller than that of the reference window. The adding of the padding may be performed by adding an image corresponding to white, black, or a background color to the periphery of the target image. In this case, the background color may be a color of a background that is a surface image without defects in the target image or a color of a background added during an image processing process involved in the process of generating the target image. However, the present application is not limited thereto.

In the embodiment, when a first size that is one of the horizontal and vertical sizes of the target image is smaller than that of the reference window and a second size that is the other is larger than that of the reference window, both the removal of at least a portion of the target image and the addition of padding may be performed.

Specifically, operations S120 to S170 may be performed to remove at least a portion of the target image. Additionally, adding padding to the target image may be performed. In this case, although addition may be performed first and then removal may be performed, the present application is not limited thereto, and removal may be performed first and then addition may be performed, or addition and removal may be performed simultaneously. Therefore, the target image in operations S120 to S170 may be a target image without padding added or target image with padding added.

In the embodiment, at least one operation of method 100 may not be performed. Specifically, at least one of operations S140 and S150 may not be performed.

For example, operations S140 and S150 may not be performed. In this case, operation S160 may be performed after operation S130, and in operation S160, the second defect score may be calculated by summing the first defect scores in a range corresponding to the reference window in the first defect matrix rather than the third defect matrix.

In addition, for example, operation S140 may not be performed. Therefore, operation S150 may be performed after operation S130, and in operation S150, the third defect matrix may be generated by removing the element corresponding to the non-defect area from the first defect matrix rather than the second defect matrix.

In addition, for example, operation S150 may not be performed. In this case, operation S160 may be performed after operation S140, and in operation S160, the second defect score may be calculated by summing the first defect scores in a range corresponding to the reference window in the second defect matrix rather than the third defect matrix.

The method 100 of FIG. 1 is illustrative, and various configurations can be applied according to embodiments of the present application.

Figure 2:
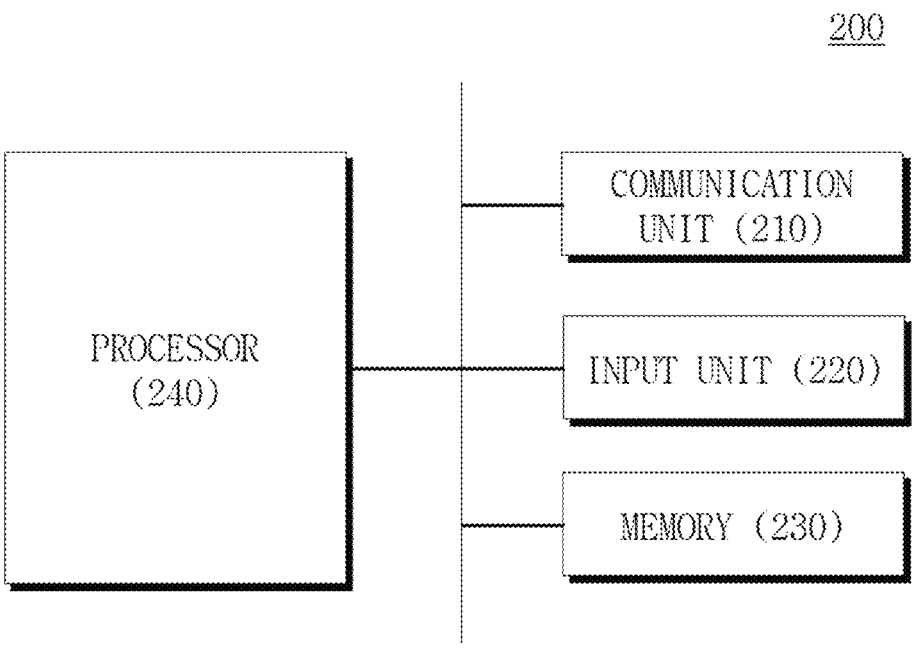
FIG. 2 is a block diagram of an apparatus for detecting a defect according to the embodiment of the present application.

FIG. 2 is a block diagram of an apparatus for detecting a defect according to the embodiment of the present application.

An apparatus 200 for detecting a defect may perform the method 100 of FIG. 1, but is not limited thereto.

Referring to FIG. 2, the apparatus 200 for detecting the defect may include a communication unit 210, an input unit 220, a memory 230, and a processor 240.

The communication unit 210 may receive data from the outside. The communication unit 210 may include a wired or wireless communication unit. When the communication unit 210 includes the wired communication unit, the communication unit 210 may include a local area network (LAN), a wide area network (WAN), a value added network (VAN), a mobile radio communication network, a satellite communication network, and one or more components that enable communication through a combination thereof. In addition, when the communication unit 210 includes the wireless communication unit, the communication unit 210 may transmit and receive data or signals wirelessly using cellular communication, wireless LAN (e.g., Wi-Fi), or the like. In the embodiment, the communication unit 210 may transmit and receive data or signals with an external device or external server under the control of the processor 240.

The input unit 220 may receive various user commands through external manipulation. To this end, the input unit 220 may include or connect one or more input devices. For example, the input unit 220 may be connected to various input interfaces such as a keypad and mouse to receive the user commands. To this end, the input unit 220 may include not only a USB port but also an interface such as Thunderbolt. In addition, the input unit 220 may include and combine various input devices such as a touch screen and button to receive external user commands.

The memory 230 may store programs and/or program commands for operating the processor 240 and temporarily or permanently store input/output data. The memory 230 may include a flash memory type, hard disk type, multimedia card micro type, or card type memory (e.g., a secure card (SD) or extreme digital (XD) memory), and a storage medium of at least one type of a random access memory (RAM), a static RAM (SRAM), a read-only memory (ROM), an electrically erasable programmable ROM (EEPROM), a programmable ROM (PROM), a magnetic memory, a magnetic disk, and an optical disk.

In addition, the memory 230 may store various network functions and algorithms and store various data, programs (one or more instructions), applications, software, commands, codes, and the like for driving and controlling the apparatus 200.

The processor 240 may control the overall operation of the apparatus 200. The processor 240 may execute one or more programs or software stored in the memory 230. The processor 240 may be a central processing unit (CPU), graphics processing unit (GPU), or dedicated processor 240 in which the methods according to the embodiments of the present application are performed.

In the embodiment, the processor 240 may acquire the target image, detect at least one defect area from the target image, generate the first defect matrix having the size corresponding to the target image and using the first defect score calculated based on the number of defect areas as the element, calculate the plurality of second defect scores by summing the first defect scores in a range corresponding to the predetermined reference window in the first defect matrix, and generate the defect image by extracting the image corresponding to the reference window from the target image based on the second defect score.

In the embodiment, the processor 240 may input the defect image as input data into the network function and generate the surface defect information. Here, the network function may be trained to output the surface defect information using the image with the size corresponding to the reference window as input data.

In the embodiment, the processor 240 may determine the element of the first defect matrix according to the number of defect areas detected from the target image at the position corresponding to the element.

In the embodiment, the processor 240 may calculate the second defect score, which is the sum of the first defect scores of the first defect matrix corresponding to the reference window, while moving the predetermined reference window with respect to the first defect matrix. The processor 240 may generate the defect image by extracting the image corresponding to the position of the reference window with the highest second defect score from the target image.

In the embodiment, the processor 240 may generate the second defect matrix by applying the standard deviation for each local area of the target image to the first defect matrix. The processor 240 may calculate the second defect score using the second defect matrix with which the first defect matrix is replaced.

In the embodiment, the processor 240 may generate the standard deviation matrix by calculating the standard deviation for each local area in the target image and generate the second defect matrix by summing weights of the first defect matrix and the standard deviation matrix.

In the embodiment, the processor 240 may generate the third defect matrix by removing the elements corresponding to the non-defect areas from the second defect matrix. The processor 240 may calculate the second defect score using the third defect matrix with which the second defect matrix is replaced.

In the embodiment, the processor 240 may generate the non-defect matrix having the size corresponding to the target image and representing at least one of the background and padding in the target image and generate the third defect matrix by performing the AND operation on the non-defect matrix and the first defect matrix.

In the embodiment, the processor 240 may detect the defect area by generating the boundary value information from the target image, generating the boundary direction information from the target image, selecting information on the boundary value greater than or equal to the predetermined critical value based on the boundary value information and the boundary direction information, and detecting the defect area based on the selected boundary value information and the corresponding boundary direction information.

In the embodiment, the processor 240 may detect the defect area or generate the defect image when at least one of the horizontal and vertical sizes of the target image is larger than that of the reference window.

In the embodiment, the processor 240 may add padding to the periphery of the target image so that the target image corresponds to the reference window when at least one of the horizontal and vertical sizes of the target image is smaller than that of the reference window.

The apparatus illustrated in FIG. 2 is illustrative, and various configurations can be applied according to embodiments of the present application.

Figure 3:
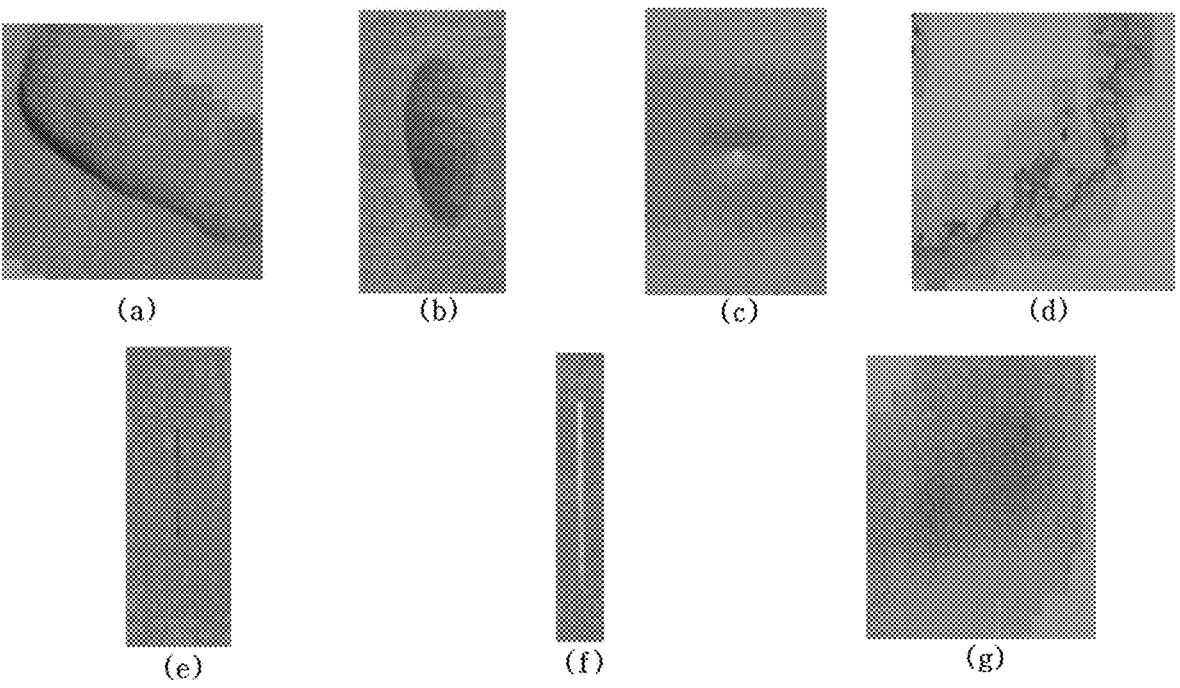
FIG. 3 shows exemplary views of target images on which defects are formed.

FIG. 3 shows exemplary views of target images on which defects are formed.

The defects illustrated in FIG. 3 occur on the surface of the cold-rolled steel sheet and may mean carbon, an oil mark, a roll mark, rust, scab, scratch, or slip mark in the order from (a)-(g).

FIG. 3 is illustrative, and various configurations can be applied according to embodiments of the present application.

FIGS. 4 and 5 are exemplary views of image preprocessing for detecting a defect according to the embodiment of the present application.

Referring to FIG. 4, when both the horizontal and vertical sizes of the target image are smaller than that of the reference window, a defect image may be generated by adding padding to the periphery of the target image.

Referring to FIG. 5, a case in which the horizontal size of the target image is smaller than that of the reference window and the vertical size of the target image is larger than that of the reference window is illustrated. In this case, padding may be added to the target image in the horizontal direction, which is smaller than that of the reference window, and the defect image may be generated by extracting the area that best represents the defect characteristics in the vertical direction, which is larger than that of the reference window.

FIGS. 4 and 5 are illustrative, and various configurations can be applied according to embodiments of the present application.

FIG. 6 is a view for describing a process of detecting a defect according to the embodiment of the present application.

As illustrated, when a target image with defects formed on a surface is acquired, at least one defect area may be detected by performing boundary detection on the image or the like. A first defect matrix may be generated by calculating a first defect score based on the defect area.

In addition, a deviation matrix may be generated by calculating a standard deviation for each local area of the target image, and a second defect matrix may be generated by weight-multiplying the deviation matrix and the first defect matrix.

Although not illustrated, a third defect matrix may be generated by removing the non-defect areas (background and blank space) from the second defect matrix. In the third defect matrix, the second defect score may be calculated while moving the reference window, and based on this, a defect image may be generated from the reference window at a position with the greatest second defect score.

FIG. 6 is illustrative, and various configurations can be applied according to embodiments of the present application.

The method according to the embodiment of the present application can be implemented in the form of program commands that may be performed through various computer devices and recorded on a computer-readable medium. The computer-readable medium may include program commands, data files, data structures, and the like alone or in combination. The program commands recorded on the medium may be specially designed and constructed for the present application or may be known and available to those skilled in the art of computer software. Examples of the computer-readable recording medium include magnetic media such as a hard disk, a floppy disk, and a magnetic tape, optical media such as a CD-ROM and a DVD, and magneto-optical media such as a floptical disk, and hardware devices specifically configured to store and execute program commands, such as a ROM, a RAM, and a flash memory. Examples of the program commands include not only machine language code such as that produced by a compiler, but also high-level language code that may be executed by a computer using an interpreter or the like.

In addition, the method according to the disclosed embodiments may be provided by being included in a computer program product. The computer program product may be traded between sellers and buyers as commodities.

The computer program product may include a software program and a computer-readable storage medium in which the software program is stored. For example, the computer program product may include a product in the form of a software program (e.g., a downloadable app) distributed electronically by a manufacturer of an electronic device or through an electronic marketplace (e.g., a Google Play Store or an App Store). For electronic distribution, at least some of the software programs may be stored in a storage medium or temporarily generated. In this case, the storage medium may be a manufacturer's server, an electronic market server, or a relay server's storage medium for temporarily storing SW programs.

The computer program product may include a storage medium of a server or a storage medium of a client device in a system composed of the server and the client device. Alternatively, when a third device (e.g., a smartphone) communicatively connected to the server or client device is present, the computer program product may include a storage medium of the third device. Alternatively, the computer program product may include a software program, which is transmitted from the server to the client device or third device or from the third device to the client device.

In this case, one of the server, the client device, and the third device may execute the computer program product to perform the method according to the disclosed embodiments. Alternatively, two or more of the server, the client device, and the third device may execute the computer program product to perform the method according to the disclosed embodiments in a distributed manner.

For example, the server (e.g., a cloud server or artificial intelligence server) may execute the computer program product stored on the server and control the client device communicatively connected to the server to perform the method according to the disclosed embodiments.

Although the embodiments have been described above in detail, the scope of the present application is not limited thereto, and various modifications and improvements by those skilled in the art using the basic concept of the present application defined in the appended claims are also included in the scope of the present application.

What is claimed is:

1. A method of detecting a surface defect, the method comprising:
 acquiring a target image;
 detecting at least one defect area from the target image;
 generating a first defect matrix having a size corresponding to the target image, wherein the first defect matrix has a plurality of elements, and each of the plurality of elements is a first defect score calculated based on a number of the at least one defect area detected from the target image at a position corresponding to each element;
 calculating a plurality of second defect scores while moving a predetermined reference window with respect to the first defect matrix, wherein each second defect score is a sum of the first defect scores of the first defect matrix corresponding to the predetermined reference window, and the predetermined reference window is a virtual area with a predetermined size; and
 generating a defect image by extracting, from the target image, an image corresponding to a position of the predetermined reference window with a largest second defect scores.

2. The method of claim 1, further comprising inputting the defect image as input data into a network function and generating surface defect information,
 wherein the network function is trained to output the surface defect information using an image with a size corresponding to the predetermined reference window as input data.

3. The method of claim 1, further comprising generating a second defect matrix by applying a standard deviation for each local area of the target image to the first defect matrix,
 wherein the calculating of the plurality of second defect scores is performed on the second defect matrix with which the first defect matrix is replaced, and
 wherein the applying the standard deviation includes generating a standard deviation matrix by calculating the standard deviation for each local area of the target image, and combining the first defect matrix with the standard deviation matrix.

4. The method of claim 3, wherein the generating of the second defect matrix includes generating a standard deviation matrix by calculating the standard deviation for each the local area from the target image and summing weights of the first defect matrix and the standard deviation matrix,
 wherein the summing of the weights of the first defect matrix and the standard deviation matrix includes:
 multiplying the first defect matrix by a first weight to obtain a first product, multiplying the standard deviation matrix by a second weight to obtain a second product, and summing the first product and the second product.

5. The method of claim 3, further comprising generating a third defect matrix by removing an element corresponding to a non-defect area from the second defect matrix,
   wherein the calculating of the plurality of second defect scores is performed on the third defect matrix with which the second defect matrix is replaced, and
   wherein the removing the element corresponding to the non-defect area from the second defect matrix is performed by an AND operation on a non-defect matrix and the first defect matrix, the non-defect matrix having the size corresponding to the target image and representing at least one of background and padding from the target image.

6. The method of claim 3, wherein the detecting of the defect area includes generating boundary value information from the target image, generating boundary direction information from the target image, selecting a boundary value information which is greater than or equal to a predetermined critical value based on the boundary value information and the boundary direction information, and detecting the defect area based on the selected boundary value information and corresponding boundary direction information.

7. The method of claim 1, wherein the detecting of the at least one defect area, the generating of the first defect matrix, the calculating of the plurality of second defect scores, and the generating of the defect image are performed when at least one of a horizontal size and a vertical size of the target image is larger than that of the predetermined reference window.

8. The method of claim 1, further comprising adding padding to a periphery of the target image so that the target image corresponds to the predetermined reference window when at least one of a horizontal size and a vertical size of the target image is smaller than that of the predetermined reference window.

9. A computer program stored in a non-transitory recording medium to execute the method of claim 1.

10. An apparatus for detecting a surface defect, the apparatus comprising:
   a memory storing a program for detecting a surface defect; and
   a processor configured to:
   acquire a target image, detect at least one defect area from the target image,
   generate a first defect matrix having a size corresponding to the target image, wherein the first defect matrix has a plurality of elements, and each of the plurality of elements is a first defect score calculated based on a number of defect areas detected from the target image at a position corresponding to each element,
   calculate a plurality of second defect scores while moving a predetermined reference window with respect to the first defect matrix, wherein each second defect score is a sum of the first defect scores of the first defect matrix corresponding to the predetermined reference window, and the predetermined reference window is a virtual area with a predetermined size, and
   generate a defect image by extracting, from the target image, an image corresponding to a position of the predetermined reference window with a largest second defect score.

11. The apparatus of claim 10, wherein the processor is further configured to generate a second defect matrix by applying a standard deviation for each local area of the target image to the first defect matrix, and
   calculate the plurality of second defect scores using the second defect matrix with which the first defect matrix is replaced,
   wherein the applying the standard deviation includes generating a standard deviation matrix by calculating the standard deviation for each local area of the target image, and combining the first defect matrix with the standard deviation matrix.

12. The apparatus of claim 11, wherein the processor is further configured to generate a third defect matrix by removing an element corresponding to a non-defect area from the second defect matrix, and
   calculate the plurality of second defect scores using the third defect matrix with which the second defect matrix is replaced,
   wherein the third defect matrix is generated by generating a non-defect matrix having a size corresponding to the target image and representing at least one of background and padding from the target image, and performing an AND operation on the non-defect matrix and the first defect matrix to remove the element corresponding to the non-defect area from the second defect matrix.

* * * * *